(12) United States Patent
Ikari

(10) Patent No.: US 9,699,326 B2
(45) Date of Patent: Jul. 4, 2017

(54) APPARATUS FOR IDENTIFYING ABNORMALITIES IN AN IMAGE SYSTEM AND, METHOD FOR CONTROLLING APPARATUS, AND STORAGE MEDIUM

(71) Applicant: CANON KABUSHIKI KAISHA, Tokyo (JP)

(72) Inventor: Daiki Ikari, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/548,176

(22) Filed: Nov. 19, 2014

(65) Prior Publication Data

US 2015/0146264 A1 May 28, 2015

(30) Foreign Application Priority Data

Nov. 22, 2013 (JP) ................................. 2013-241946

(51) Int. Cl.
*H04N 1/00* (2006.01)

(52) U.S. Cl.
CPC ..... *H04N 1/00005* (2013.01); *H04N 1/00013* (2013.01); *H04N 1/00015* (2013.01); *H04N 1/00023* (2013.01); *H04N 1/00034* (2013.01); *H04N 1/00045* (2013.01); *H04N 1/00053* (2013.01); *H04N 1/00063* (2013.01); *H04N 1/00068* (2013.01); *H04N 2201/0094* (2013.01)

(58) Field of Classification Search
CPC ........... H04N 1/00045; H04N 1/00068; H04N 1/00034; H04N 1/00063; H04N 1/4097; G01N 21/94; G06K 9/40
USPC ....... 358/1.13, 3.26, 504, 531; 382/112, 275
See application file for complete search history.

(56) References Cited

U.S. PATENT DOCUMENTS

| 5,214,470 A * | 5/1993 | Denber ........................... 355/75 |
| 6,035,072 A * | 3/2000 | Read ............................. 382/275 |
| 2002/0158192 A1* | 10/2002 | Gann ..................... G01N 21/94 250/234 |
| 2003/0133608 A1* | 7/2003 | Bernstein ............. H04N 1/4097 382/163 |
| 2006/0250469 A1* | 11/2006 | Silverbrook et al. ......... 347/104 |

FOREIGN PATENT DOCUMENTS

JP 201222232 A 2/2012

* cited by examiner

*Primary Examiner* — Jamares Q Washington
(74) *Attorney, Agent, or Firm* — Canon USA, Inc. IP Division

(57) ABSTRACT

An apparatus includes an obtaining unit configured to obtain first image data obtained by reading, performed by a reading unit, a chart on which an image has not been formed by an image forming unit and second image data obtained by reading, performed by the reading unit, a chart formed by the image forming unit, and an estimation unit configured to change the second image data using the first image data and estimate a cause of an abnormality that has occurred in the image forming unit from a feature amount obtained by analyzing the changed image data.

16 Claims, 15 Drawing Sheets

FIG. 7
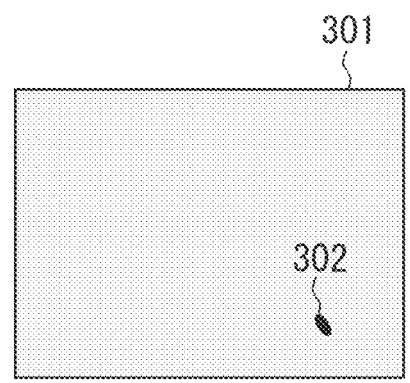
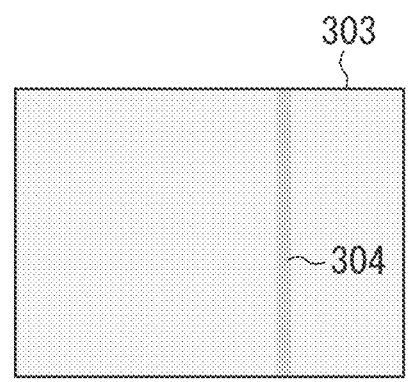
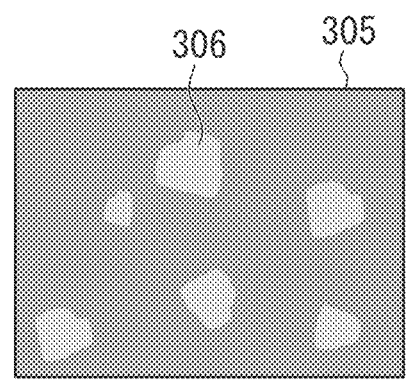

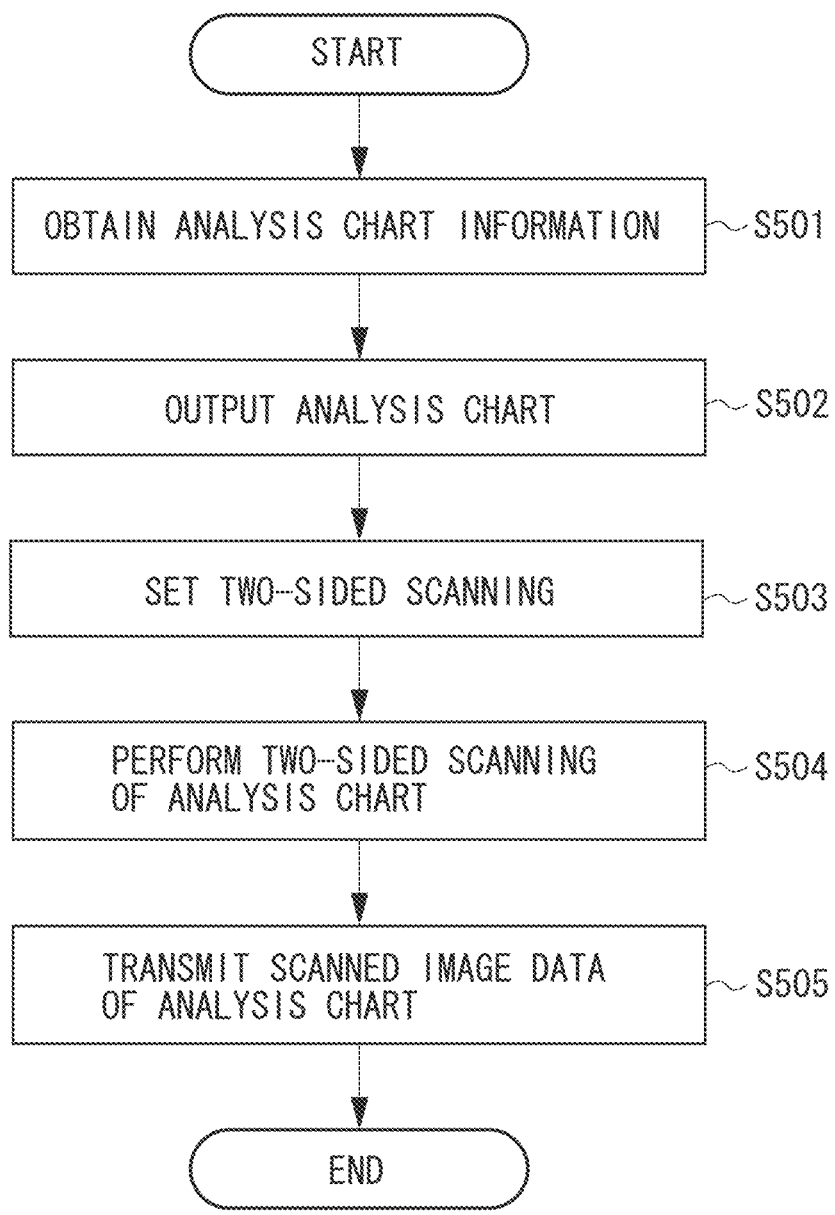

APPARATUS FOR IDENTIFYING ABNORMALITIES IN AN IMAGE SYSTEM AND, METHOD FOR CONTROLLING APPARATUS, AND STORAGE MEDIUM

BACKGROUND

Field

Aspects of the present invention generally relate to an apparatus and a method for estimating, when an abnormality has occurred in a printer, a cause of the abnormality, and a computer-readable storage medium for storing a program for executing the method.

Description of the Related Art

In recent years, apparatuses, for example a printer, which realize image quality of the same level as a printing machine have been introduced to the market along with improvement in performance of electrophotographic apparatuses. It is necessary for such apparatuses to maintain high image quality to operate similarly as the printing machine. However, if a printer is used over a long period of time, deterioration of the printer may occur, and an abnormality with respect to the image quality may occur in an image output from the printer. In general, if an "abnormal image" is generated due to such deterioration, a user who has viewed the image and noticed the abnormality contacts a service person. The service person then visits an installation location of the printer and performs measures. In such a case, it is difficult for the user to express in words a state of the abnormal image caused by the deterioration and the like. For example, if there is "unevenness", the cause thereof cannot be identified unless detailed information, such as a direction, frequency, and a cycle, in which the unevenness occurs is recognized. Consequently, when the user has pointed out the image abnormality, it is necessary for the service person to visit the installation location of the printer and directly confirm the abnormality of the image quality. The service person then predicts an abnormality location based on the confirmed abnormality and identifies service parts related thereto. The service person once returns to a service base and obtains the service parts, returns to the installation location, and performs the measures. When the service person performs as described above, travelling costs of the service person becomes high. Further, since the printer cannot be used until the service person completes performing the measures, downtime occurs so that productivity of the user is greatly lowered.

To solve such an issue, Japanese Patent Application Laid-Open No. 2012-22232 discusses a technique in which the image is output from the printer to obtain a scanned image of the output image, and the abnormality is detected. Identification of the "abnormal image" is thus simplified.

However, according to the technique discussed in Japanese Patent Application Laid-Open No. 2012-22232, if there is a cause for generating the abnormal image when the scanned image is obtained, an image abnormality may be superimposed on the image abnormality which has originally occurred. As a result, it may prevent detection of the original image abnormality which has occurred in the printed image. For example, an image reading apparatus for a digital copying machine fixes the position of an optical system and reads the image while an auto document feeder (ADF) conveys a document (a document feeding-reading method).

In such a case, since the position of the reading optical system is fixed, if dust or dirt adheres at a document read position, or the document read position becomes scratched or smudged, the image reading apparatus continues reading, for example, the dust. As a result, a linear streak may be generated in the read image. Further, smudge of a white plate or smudge of a mirror in a mirror unit may also be considered as the cause of the abnormality.

If the abnormality occurs in the reading system when the scanned image is obtained as described above, it becomes difficult to separate the cause of the original image abnormality in the print image and the cause of the abnormal image generated when the image is scanned. Further, accuracy of detecting the original image abnormality may become lowered.

SUMMARY

Aspects of the present invention are generally directed to providing an image inspection system which correctly identifies an "abnormal image", when the scanned image is obtained and the image abnormality has occurred in superimposed manner on the abnormal image generated in the print image.

According to an aspect of the present invention, an apparatus includes an obtaining unit configured to obtain first image data obtained by reading, performed by a reading unit, a chart on which an image has not been formed by an image forming unit and second image data obtained by reading, performed by the reading unit, a chart formed by the image forming unit, and an estimation unit configured to change the second image data using the first image data and estimate a cause of an abnormality that has occurred in the image forming unit from a feature amount obtained by analyzing the changed second image data.

According to the present disclosure, if an image abnormality has occurred when a scanned image is obtained, a cause of the image abnormality in a print image which occurs when an image is output and a cause of an abnormal image which occurs when an image is scanned can be easily separated.

Further, an effect of the image abnormality in the scanned image on the process for detecting the image abnormality in the print image is reduced, so that the image abnormality in the print image can be correctly detected. As a result, the cost of the service person and lowering of the user productivity after the abnormal image has occurred can be reduced.

Further features of the present disclosure will become apparent from the following description of exemplary embodiments with reference to the attached drawings.

BRIEF DESCRIPTION OF THE DRAWINGS

FIG. 7 is a diagram illustrating concrete examples of image problems which occur in the image forming apparatus.

FIG. 15 is a flowchart illustrating an example of a process performed by an image forming apparatus according to a second exemplary embodiment.

DESCRIPTION OF THE EMBODIMENTS

Various exemplary embodiments will be described in detail below with reference to the drawings.
<System Configuration>

Figure 1:
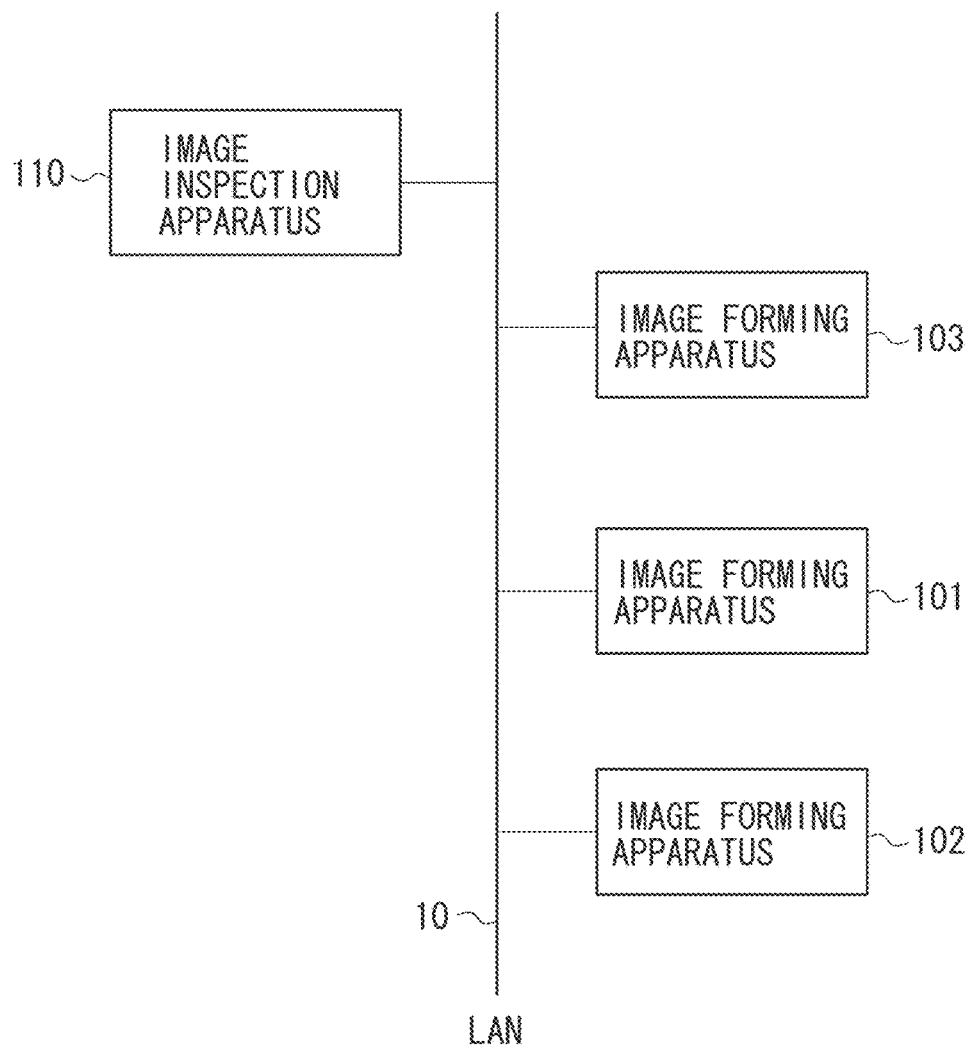
FIG. 1 is a diagram illustrating a system configuration example.

FIG. 1 is a diagram illustrating a configuration of a network system in which information on an abnormal image of each image forming apparatus is mainly communicated according to a first exemplary embodiment. The system includes image forming apparatuses 101, 102, and 103, and an image inspection apparatus 110. The image forming apparatuses 101, 102, and 103 and the image inspection apparatus 110 are connected by a local area network (LAN) 10 and capable of communicating with each other.

According to the present exemplary embodiment, information on an abnormal image which has been generated in the image forming apparatuses 101, 102, and 103 is transmitted to the image inspection apparatus 110 via the network. The image inspection apparatus 110 then performs analysis and identifies a cause of the abnormal image.
<External View of Image Forming Apparatus>

Figure 2:
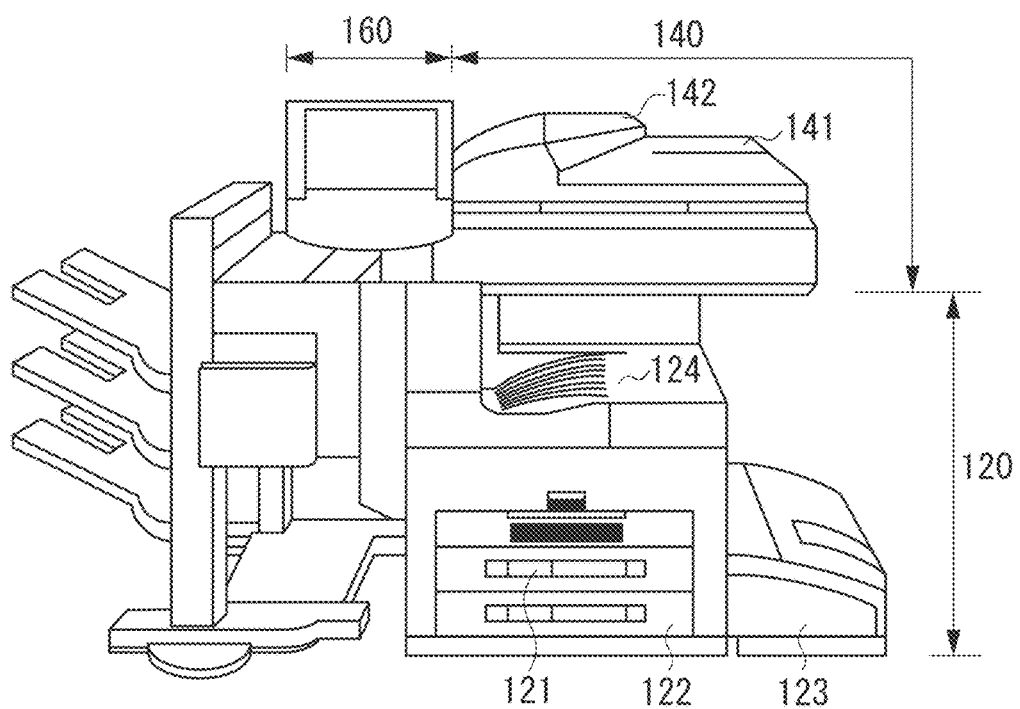
FIG. 2 is a diagram illustrating an example of an external view of an image forming apparatus.

FIG. 2 is a diagram illustrating an example of an external view of the image forming apparatus according to the first exemplary embodiment.

A scanner 140, which is an image reading unit, inputs reflected light obtained by exposure scanning performed on an image of a document using light emitted from an illumination lamp to a linear image sensor (a charge-coupled device (CCD) sensor). The scanner 140 thus converts information on the image to an electric signal. Further, the scanner 140 converts the electric signal to a luminance signal for red (R), green (G), and blue (B) colors, and outputs the luminance signal to a controller 200 illustrated in FIG. 6 to be described below as image data.

The document is set on a tray 142 of a document feeder 141. When the user gives an instruction through an operation unit 160 to start reading the document, the controller 200 transmits the instruction to read the document to the scanner 140. The scanner 140 which has received the instruction feeds the document page by page from the tray 142 of the document feeder 141 and performs a document read operation (hereinafter, such an operation mode will be referred to as a document feeding-reading mode). Further, the document may be read in such a way that the user places the document on the document positioning glass plate to be described below.

A printer 120 is an image forming device which forms the image data received from the controller 200 on a sheet.

According to the present exemplary embodiment, an electrophotographic method using a photosensitive drum, a developing device, and a fixing device is employed as an image forming method. More specifically, toner attached on the drum is transferred to and fixed on the sheet. Further, the printer 120 includes a plurality of sheet cassettes 121, 122, and 123 capable of corresponding to different sheet size and sheet orientation. A printed sheet is discharged to a sheet discharge tray 124. If an abnormality, such as deterioration and failure, occurs in the above-described scanner 140 and the printer 120, the abnormality may appear in the scanned image and the print image.
<Image Forming Apparatus: Scanner Unit>

Figure 3:
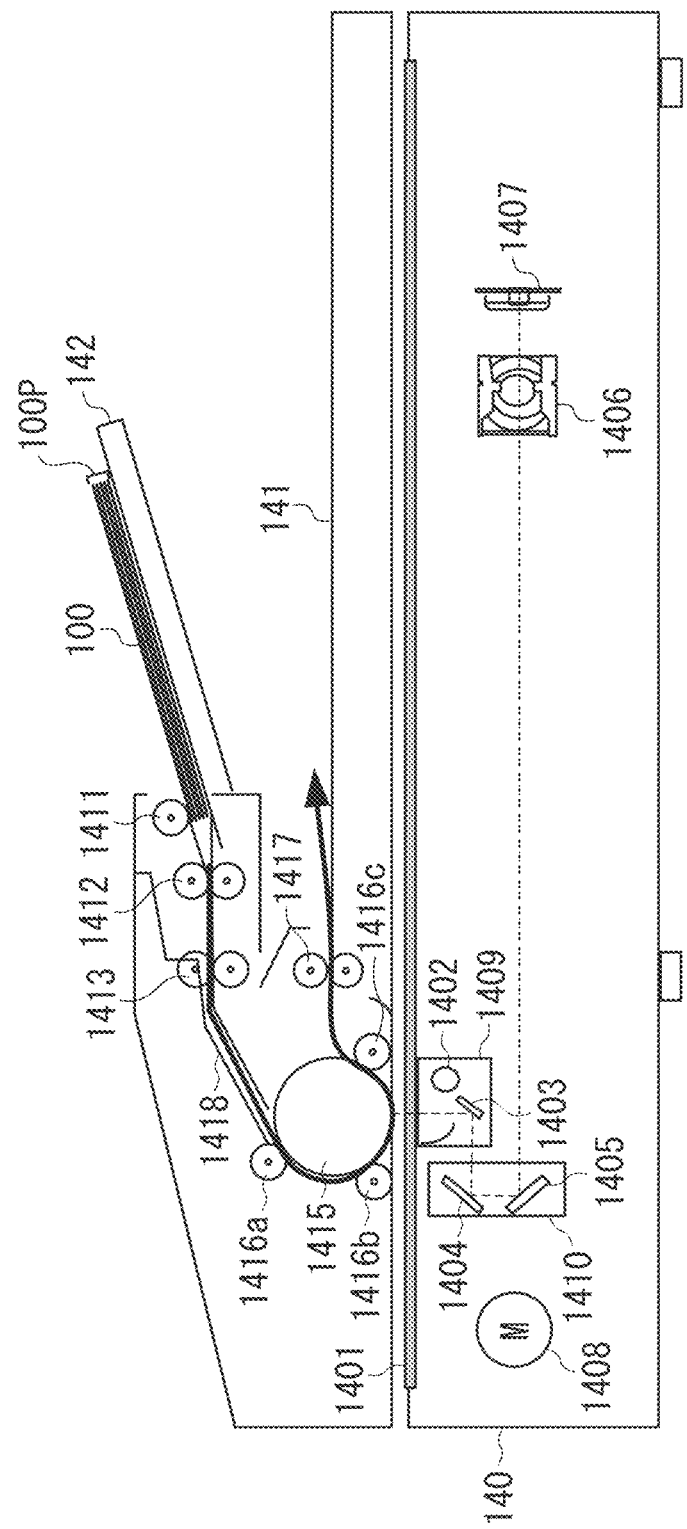
FIG. 3 is a diagram illustrating an example of a structure when a scanner unit performs a document feeding-reading operation.

FIG. 3 is a schematic diagram illustrating a main configuration of the scanner 140 employing the linear image sensor and the reading operation performed thereby according to the present exemplary embodiment. In particular, FIG. 3 is the schematic diagram illustrating the main configuration of the scanner 140 and the reading operation performed when the operation mode is the "document feeding-reading" mode in which the document is read by activating the document feeder 141.

Referring to FIG. 3, a document stack 100P to be read is placed on the tray 142. Further, a feed roller 1411, a separation-conveyance roller 1412, and a registration roller 1413 are disposed downstream to a document conveying direction. The feed roller 1411 is rotated by a driving source (not illustrated) and feeds the document stack 100P placed on the tray 142. The separation-conveyance roller 1412 disposed downstream of the feed roller 1411 then separates and conveys a top document 100 from the conveyed document stack 100P. Starting of rotation of the registration roller 1413 arranged downstream of the separation-conveyance roller 1412 becomes criterion for a subsequent conveyance timing and an image reading timing of the document 100.

An example of the driving source of the feed roller 1411, the separation-conveyance roller 1412, and the registration roller 1413 is a stepping motor.

The document 100 fed by the registration roller 1413 moves along a guiding plate 1418 and is held by a rotating large-diameter conveyance drum 1415 and driven rollers 1416a, 1416b, and 1416c. The document 100 is thus conveyed along an outer periphery of the conveyance drum 1415. In the above-described process, the document 100 once passes over a surface of a document positioning glass plate 1401 and is conveyed at constant speed in a direction of an arrow illustrated in FIG. 3.

When the document 100 passes over the surface of the document positioning glass plate 1401, the image reading unit to be described below performs image reading to the document 100.

After the image has been read, the document 100 is continuously conveyed along the outer periphery of the conveyance drum 1415 and is discharged to the document feeder 141 by a discharge roller 1417.

In the above-described document feeding-reading mode, it is only necessary to move the document in a fixed direction, so that a large amount of documents can be continuously read at high speed.

The image reading unit according to the present exemplary embodiment will be described below. In the document feeding-reading mode, the document 100 passes over the surface of the document positioning glass plate 1401 as described above. In the above-described process, a first mirror unit 1409 and a second mirror unit 1410 are moved by a motor 1408 and fixedly-arranged in the positions illustrated in FIG. 3. As a result, when the document 100 faces the surface of the document positioning glass plate 1401, an illumination lamp 1402 in the first mirror unit 1409 irradiates the document 100. The reflected light thereof is then focused on a CCD sensor 1407 by a lens 1406 via mirrors 1403, 1404, and 1405. The reflected light input to the CCD sensor 1407 is converted to the electric signal, and an analog/digital (A/D) conversion unit (not illustrated) converts the electric signal of each pixel to digital data. The converted digital data is then input to the controller 200 as a pixel signal.

The above-described method uses a cylindrical light source, and a reading line is set parallel to a longitudinal direction of the light source. The document is conveyed in a direction perpendicular to the reading line. The direction parallel to the reading line is defined as a main scanning direction, and a direction perpendicular to the reading line (a document conveying direction) is defined as a sub-scanning direction.

Further, there is a method for reading the image by placing the document to be read on the document positioning glass plate 1401 instead of the document feeding-reading mode. In such a case, the first mirror unit 1409 including the mirror 1403 and the illumination lamp 1402 moves at a speed v below the document positioning glass plate 1401 on which the document is placed. Further, the second mirror unit 1410 including the mirrors 1404 and 1405 moves at a speed ½ v in the same direction as the first mirror unit 1409 and thus scans a front side of the document 100. The first mirror unit 1409 and the second mirror unit 1410 are driven by the motor 1408.

According to the present exemplary embodiment, scan transmission of analysis charts to be described below is performed while the document is read in the document feeding-reading mode.

<Abnormal Image Occurrence in Scanning>

Figure 4:
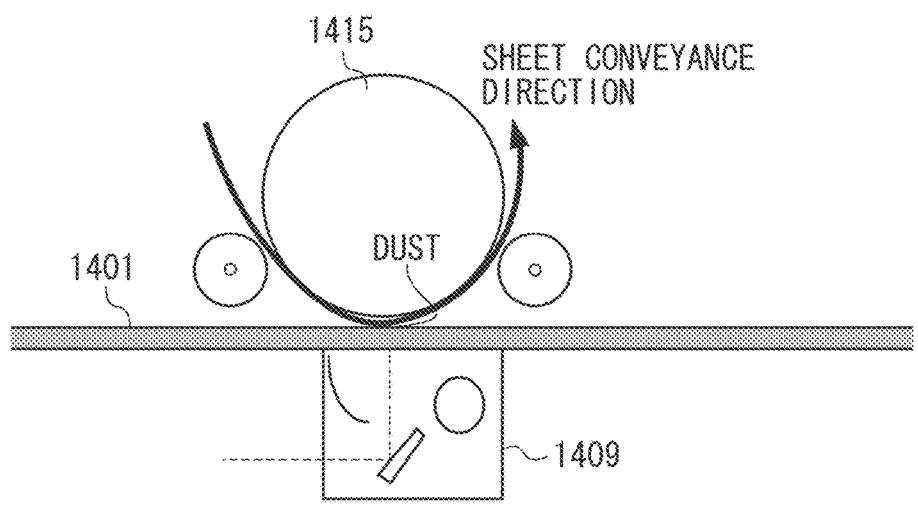
FIG. 4 is a diagram illustrating an example of accumulation of dust on a document positioning glass plate.

FIG. 4 is a diagram illustrating an example in which dust has accumulated on the document positioning glass plate 1401. When the image forming apparatus according to the present exemplary embodiment which includes an auto document feeding device reads a document in the above-described document feeding-reading mode, the image forming apparatus reads the dust adhered on the document positioning glass plate 1401. A streak is thus generated in the read image. Such a streak is generated due to the dust accumulating on the document positioning glass plate 1401 between the first mirror unit 1409 and the conveyance drum 1415 (an intersection between the document positioning glass plate 1401 and a dotted line illustrated in FIG. 4). Since the streak is generated due to the accumulation of dust and is not an image drawn on the document, there is no correlation between the streak and surrounding pixels in the document.

Figure 5:
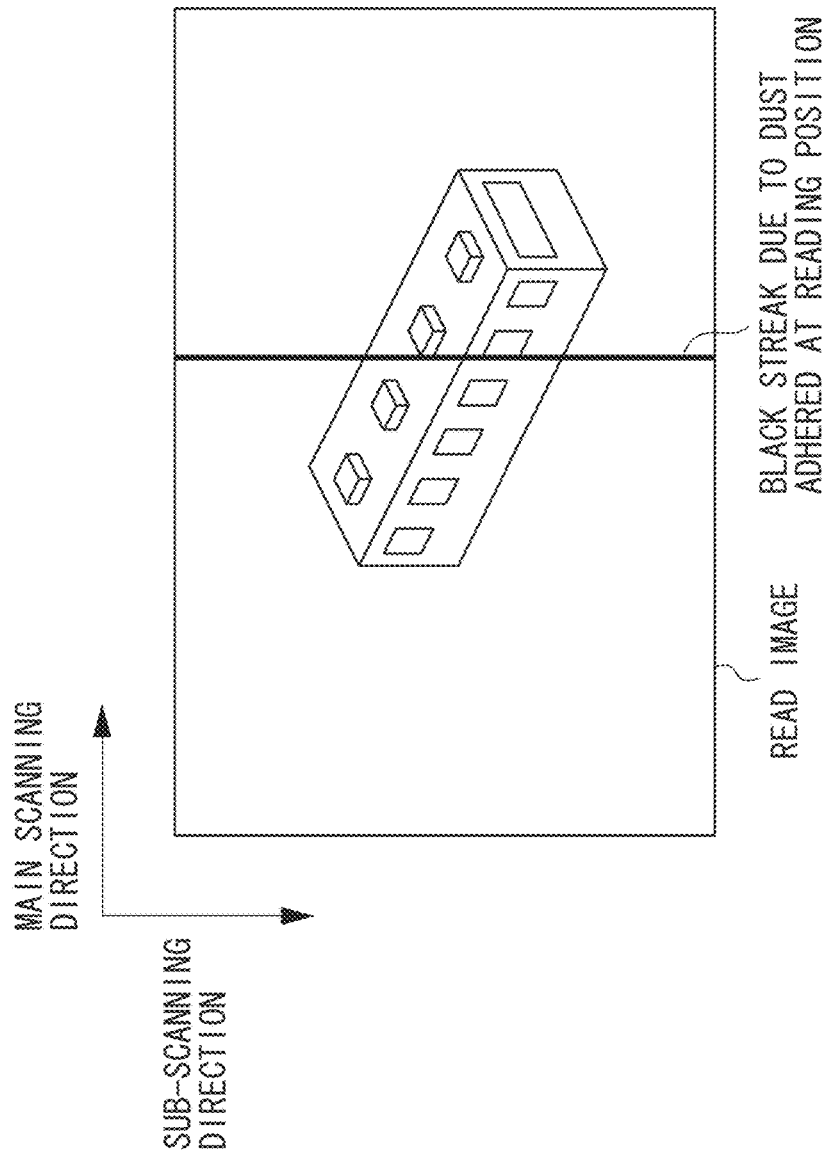
FIG. 5 a diagram illustrating an example of a read image when dust adheres to the document positioning glass plate.

FIG. 5 is a diagram illustrating an example of the read image when the dust adheres to the document positioning glass plate 1401. Referring to FIG. 5, the image includes a black streak (abnormal pixels). The black streak appears with width in a specific position in the main scanning direction due to the effect of the dust when the document feeding-reading operation is performed, and extends as a streak in the sub-scanning direction. In such a case, the streak adversely affects scanning of the analysis chart used for analyzing the cause of the abnormal image and transmission of the image data obtained by scanning the analysis chart to be described below.

Hereinafter, the image data obtained by scanning the image or the chart will be referred to as scanned image data.

<Image Forming Apparatus: Controller>

Figure 6:
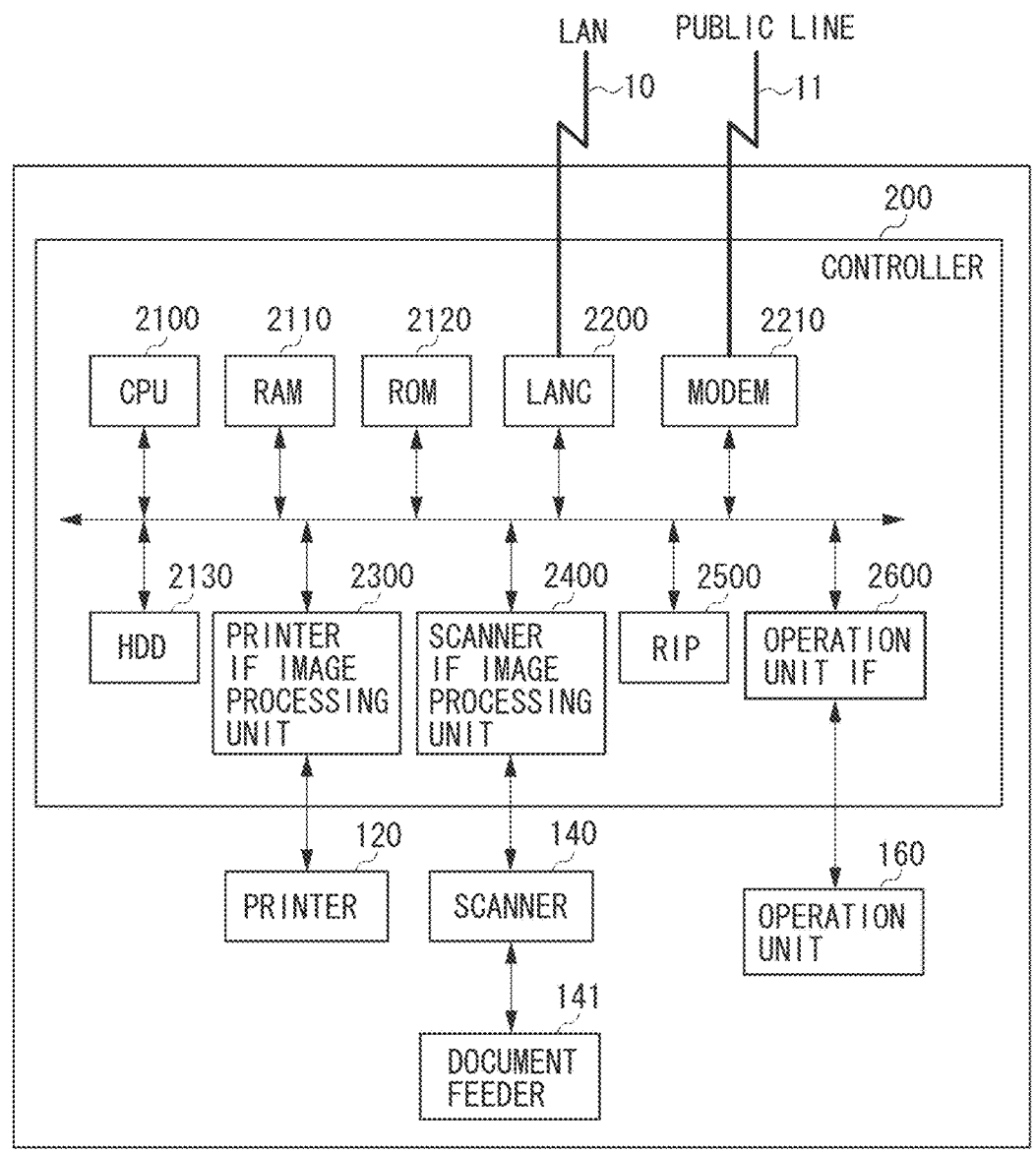
FIG. 6 is a block diagram illustrating a configuration example of a controller.

FIG. 6 is a block diagram illustrating a hardware configuration of the image forming apparatus according to the present exemplary embodiment, and in particular, a configuration example of the controller in detail.

The controller 200 is coupled to the scanner 140, which is an image input device, the printer 120, which is an image output device, the LAN 10, and a public line (a wide area network (WAN)) 11. The controller 200 collectively controls operations of the image forming apparatus and controls input and output of image information and device information.

A central processing unit (CPU) 2100 is a processor which controls an entire image forming apparatus and collectively controls access between the image forming apparatus and the various connected devices based on a control program stored in a read-only memory (ROM) 2120. Further, the CPU 2100 collectively controls various processes performed in the controller 200. A random access memory (RAM) 2110 is a system work memory used for the CPU 2100 to operate, and is also an image memory for temporarily storing the image data. The ROM 2120 is a boot ROM which stores a boot program of the system. A hard disk drive (HDD) 2130 mainly stores image data and information necessary for activating and operating a computer (system software). Instead of using the HDD 2130, such data may be stored in a recording medium capable of holding the stored data even when the power is turned off.

A LAN controller (LANC) 2200 connects to the LAN 10 and inputs and outputs image data to be output and the information related to device control to and from a personal computer (PC, not illustrated) of a user. Further, the LANC 2200 inputs and outputs data on an abnormal image to and from the image inspection apparatus 110 to be described below. A modem 2210 connects to the public line 11 and inputs and outputs data.

A printer interface (IF) image processing unit 2300 connects to the printer 120 and communicates with a CPU included in the printer 120. Further, the printer IF image processing unit 2300 performs image processing, such as halftone processing, for printing and outputting the image data. A scanner IF image processing unit 2400 connects to the scanner 140 including the document feeder 141 and communicates with a CPU included in the scanner 140. Further, the scanner IF image processing unit 2400 performs image processing, such as shading correction processing, for scanning and inputting the image data.

A raster image processor (RIP) 2500 rasterizes image data (in a page description language (PDL) code) received from an external user PC via the LAN 10 to bitmap data.

An operation unit IF 2600 outputs the image data to be displayed on the operation unit 160 from the controller 200 to the operation unit 160. Further, the operation unit IF 2600 outputs the information input to the operation unit 160 by the user of the image forming apparatus to the controller 200.

<Abnormal Image Occurrence in Printing>

FIG. 7 is a diagram illustrating concrete examples of image problems occur in the output image, when printing is performed using the image forming apparatus. In a dust problem image 301, a small smudge 302 adheres to an output image. In a streak problem image 303, a streak 304 appears in a vertical direction or a horizontal direction of the image. In an unevenness problem image 305, spotted and linear abnormalities 306 are visible in the entire image. Further, there are image problems in terms of color and a toner scattering problem mainly occur to thin lines due to heat of the fixing device (not illustrated). The above-described image problems are representative examples, and other image problems which the user considers as abnormal occur due to various causes in the image forming apparatus 103. Such image problems are caused by abnormalities (failure and deterioration) of various components, such as the photosensitive drum, the developing device, and the fixing device which are used for realizing image formation by the electrophotographic method in the printer 120. Further, such problems can be largely classified according to a size of an occurrence location of the problem (hereinafter referred to as a problematic location) and a position at which the problem occurs in the image. More specifically, the problems are classified according to whether the problematic location is large or small, and whether the position at which the problem occurs is the entire image or a portion of the image. In the dust problem image 301, the problematic location is small and the position at which the problem occurs is a portion of the image. In the unevenness problem image 305, the problematic location is large and the position at which the problem occurs is the entire image. In the streak problem image 303, the problematic location is small (or thin) and the position at which the problem occurs is the entire image in only one of the vertical direction or the horizontal direction of the image.

It is thus necessary to reproduce the image problem for analyzing the cause of the image abnormality. An image required for such a reproduction will be described below. In the case of the dust problem image 301, the occurrence location cannot be identified, and the problematic location is small, so that it becomes necessary to analyze the entire image for identifying the image problem. However, in the case of the streak problem image 303, the problem certainly appears by viewing the image in the horizontal direction. Further, in the case of the unevenness problem image 305, the problem occurs in the entire image, so that the problem appears even if only a portion of the image is viewed. The size and type of the image necessary for performing analysis are thus different depending on a type of an image problem in an image to be detected.

According to the present exemplary embodiment, the printer unit 120 or the printer IF image processing unit 2300 in the image forming apparatus according to the present exemplary embodiment includes a function for outputting an analysis chart when such an image problem occurs. The analysis chart is an image for reproducing the problem.

A type of the chart to be used in the analysis is determined according to the type of the image problem to be detected.

The image forming apparatus outputs the analysis chart in which the image problem is reproduced, reads the analysis chart using the scanner 140 and the document feeder 141, and transmits the read image data to the image inspection apparatus 110 on the network via the LANC 2200.

<Image Inspection Apparatus: Hardware Configuration>

Figure 8:
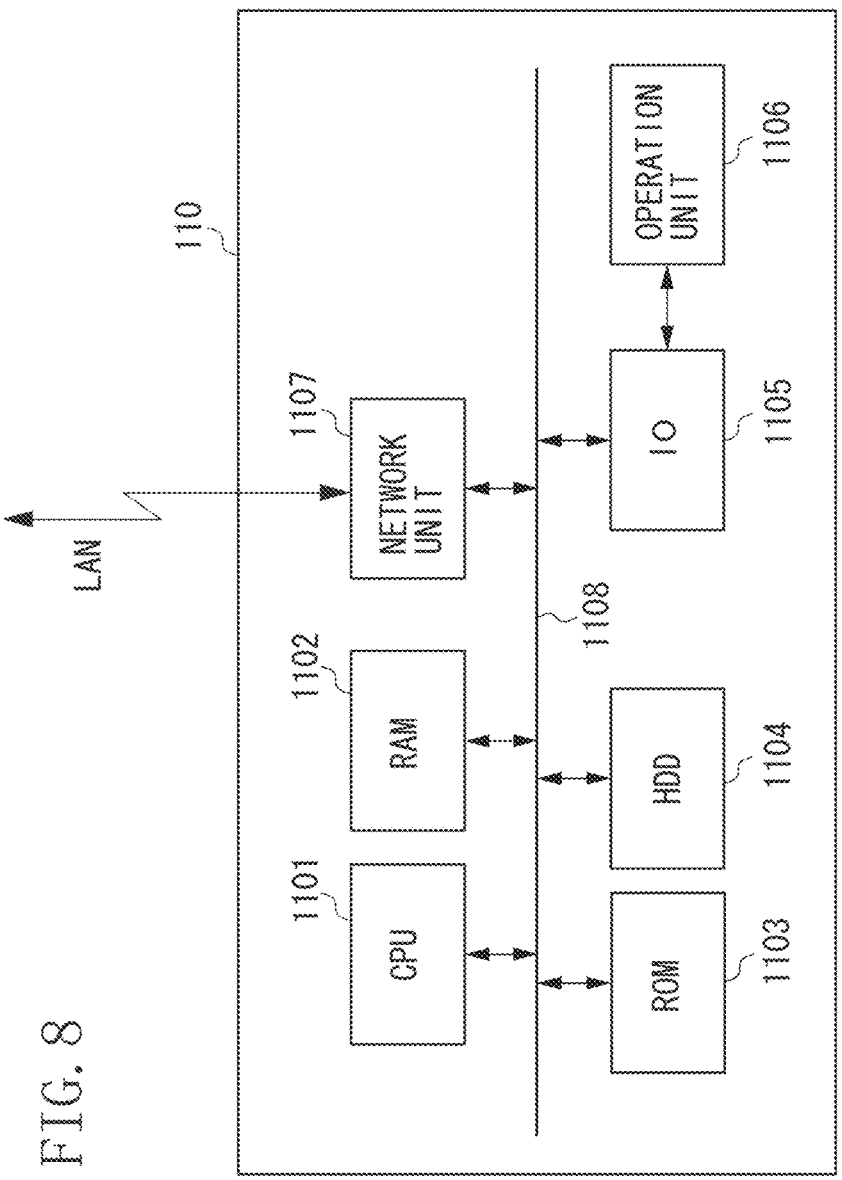
FIG. 8 is a block diagram illustrating a configuration example of an image inspection apparatus.

FIG. 8 illustrates an example of the hardware configuration of the image inspection apparatus 110. The image inspection apparatus 110 includes a CPU 1101, a RAM 1102, a ROM 1103, an HDD 1104, a network unit 1107, an input/output (IO) unit 1105, and an operation unit 1106 which are connected to each other by a system bus 1108.

The CPU 1101 reads programs, such as an operating system (OS) and application software, from the HDD 1104 to execute the programs and thus provides various functions. Further, the CPU 1101 collectively controls an image inspection process performed by the image inspection apparatus 110. The RAM 1102 is a system work memory used when the CPU 1101 executing the programs. The ROM 1103 stores programs for activating a basic input/output system (BIOS) and the OS, and setting files. The HDD 1104 stores system software and a program for realizing the image inspection process to be described below. The program is stored in a storage medium and distributed, or downloaded from a server (not illustrated) connected via the LAN 10, and installed in the HDD 1104. The network unit 107 is connected to the LAN 10 and communicates (performs transmission and reception) with external devices, such as the image forming apparatuses 101, 102, and 103. The IO unit 1105 is an interface for inputting and outputting information to and from the operation unit 1106 which includes a liquid crystal display and an input/output device (not illustrated), such as a mouse. Predetermined information is displayed on the liquid crystal display at predetermined resolution and a predetermined color number based on screen information instructed by the program. For example, a graphical user interface (GUI) screen is formed on the liquid crystal display, and various windows and data necessary for operating the image inspection apparatus 110 is displayed.

<Image Inspection Apparatus: Configuration of Image Inspection Function>

Figure 9:
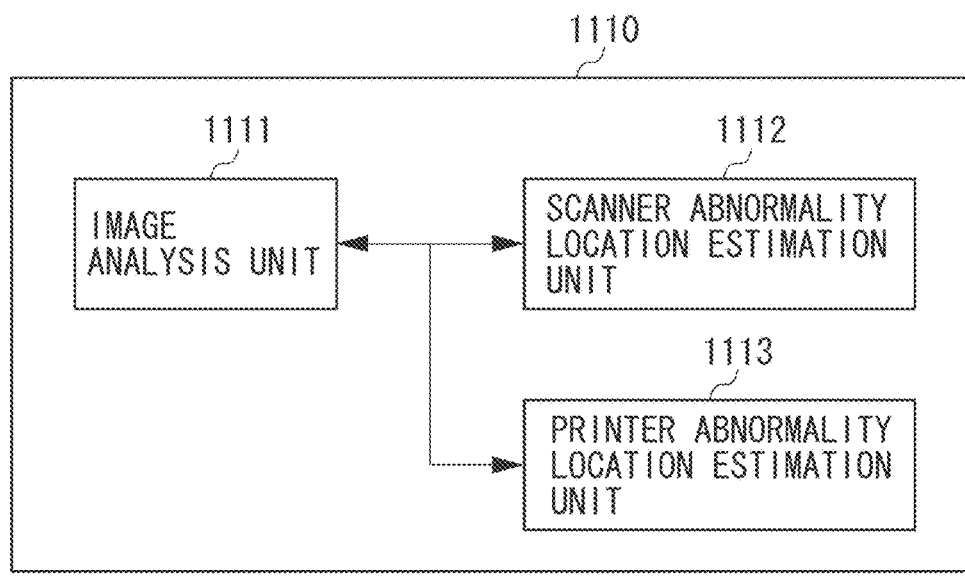
FIG. 9 is a block diagram illustrating an example of an image inspection program in the image inspection apparatus.

FIG. 9 is a diagram illustrating an example of an image inspection program 1110 executed by the image inspection apparatus 110. The image inspection program 1110 is stored in the HDD 1104 as a function to be realized by the image inspection apparatus 110. The image inspection program 1110 is read from the HDD 1104 to the RAM 1102 by the CPU 1101 executing the boot program. The CPU 1101 then executes the program read into the RAM 1102.

Figure 10:
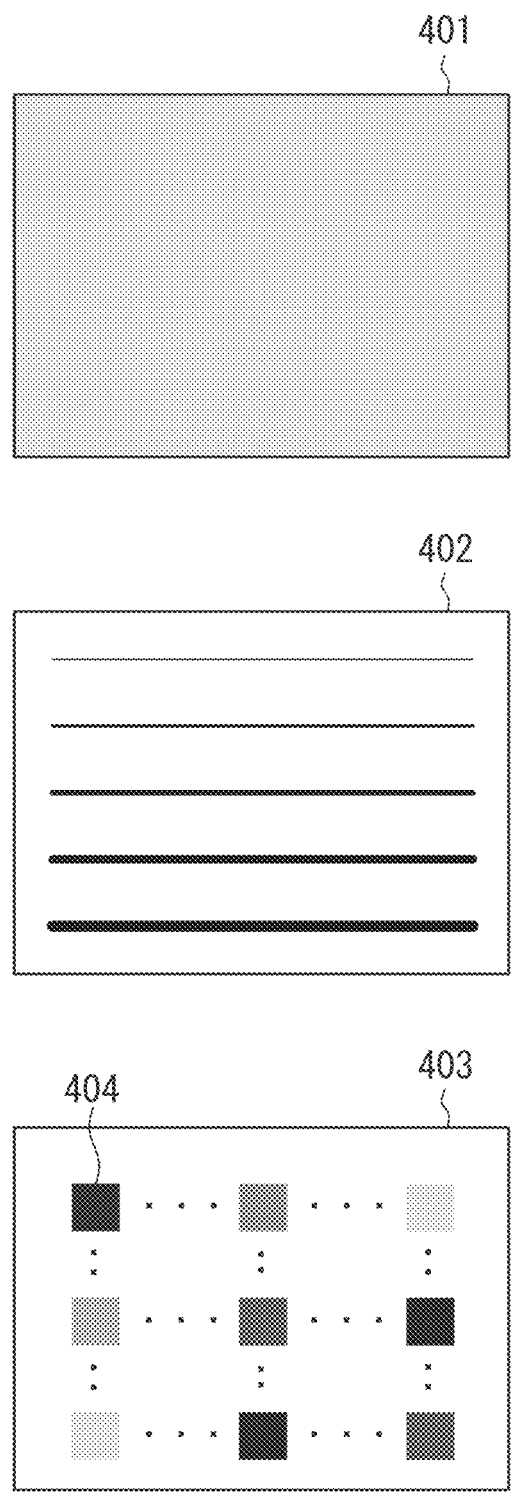
FIG. 10 is a diagram illustrating concrete examples of analysis charts.

An image analysis unit 1111 implemented by the image inspection program 1110 executed by the image inspection apparatus 1110 will be described below along with examples of charts necessary for performing the analysis. FIG. 10 is a diagram illustrating concrete examples of the charts. A solid chart 401 is an example of a chart uniformly filled with the same color. The solid chart 401 is effective for analyzing the dust problem image 301, the streak problem image 303, and the unevenness problem image 305 which are abnormal images generated when printing. The image forming apparatus 103 includes the photosensitive drum, the developing device, and the fixing device (not illustrated), and generates a printed product by transferring toner attached to the drum to a sheet and fixing the transferred toner on the sheet. The image forming apparatus 103 may include the drums for each of cyan (C), magenta (M), yellow (Y), and black (K) colors, or may include one drum which corresponds to all colors. In the case of the image forming apparatus 103 including four drums, the image problem may occur in only a specific color, so that the solid chart 401 is required for each color. Density of the solid chart 401 is not limited thereto, and is matched to a density range in which the image problem is easily detectable.

The density range in which the image problem is easily detectable will be described in detail below.

For example, a case where the image problem to be detected is the dust problem image 301 will be described below. It is highly likely that the density of image data of a dust (smudged) portion read together with the analysis chart in scanning is the maximum density. Accordingly, it is desirable for the density of the solid chart 401 to be intermediate density instead of the maximum density so that the image data of the dust (smudged) portion becomes more noticeable as compared to the surroundings.

On the other hand, if the streak problem image 303 is to be detected, it is desirable for the density of the solid chart 401 to be high for detecting a streak of low density.

As described above, it is necessary to change the density of the solid chart 401 according to the density of the problematic portion of the image problem to be detected. The solid chart 401 may thus be one solid chart having densities corresponding to all problematic images to be detected, or may be a plurality of solid charts if one chart cannot correspond to all densities.

It is assumed that there is a plurality of image problems. In such a case, the solid chart formed of a plurality of densities may become necessary. A thin line chart 402 is an example of a chart in which thin lines are drawn for detecting the scattering problem described above. The images included in the thin line chart 402 is not limited to the thin lines, and may be small characters, as long as a problem unique to thin drawings can be analyzed. The thin line chart 402 is thus not limited thereto. A color patch chart 403 is an example of a chart to be used in analyzing the color problem. Patches 404 included in the color patch chart 403 are single color patches and mixed color patches which are aligned as necessary. If uniformity of the color in the vertical direction or the horizontal direction is to be analyzed, it is necessary to align the color patches 404 of the same color in the vertical direction or the horizontal direction.

When analysis is performed using the solid chart 401, it is necessary to determine whether there is a portion in which a feature amount is different from the surroundings in the entirely uniform image.

For example, a histogram of signal values of scanned image data of the solid chart 401 in which the image abnormality has occurred in printing is obtained as a feature amount. The histogram is then compared with a histogram of the scanned image data of the solid chart 401 in which the image abnormality has not occurred in printing, and the analysis is performed using the difference. Further, frequency analysis on the scanned image data of the solid chart 401 may be similarly performed for analyzing whether a component other than a direct-current component is detected.

When analysis is performed using the thin line chart 402, it is necessary to determine whether there is scattering or bleeding around the thin lines in the output thin line chart 402. For example, surroundings of the thin line to be analyzed is minutely viewed and compared with scanned image data of the thin line chart 402 which is output when the abnormal image has not been generated, and the difference is determined. For example, a thin line area is detected from the scanned image data of the thin line chart 402 using edge detection and conventional black character determination. Rounding of the edge and a change in the color from paper white due to scattering of the toner on the paper white around the edge are then analyzed.

When analysis is performed using the color patch chart 403, a pixel value of each patch 404 included in scanned image data of the color patch chart 403 is obtained. Generally, the pixel values of a small area in the patch 404 is averaged and set as the pixel value of the patch.

The obtained pixel value is then compared with a pixel value of the patch in scanned image data of the color patch chart 403 which is output when it has been determined that the abnormal image has not been generated, and the difference is analyzed. Further, if the same color patches 404 are arranged in the color patch chart 403, the pixel values of the patches 404 in the scanned image data are compared, and the uniformity within a surface is analyzed.

A chart analysis result obtained by each of the above-described analysis methods is calculated as the feature amount and used by a printer abnormality location estimation unit 1113 to be described below.

The above-described methods are only examples of the analysis method, and any method may be employed as long as the image problem to be inspected can be appropriately analyzed.

Further, blank paper scan data which is a result obtained by scanning a blank document is used for calculating the feature amount, similarly as the chart analysis, for confirming an abnormality location in the scanner to be described below.

According to the present exemplary embodiment, the blank paper is a document which does not include printed information.

More specifically, the blank paper is used for identifying, in a case where a pixel which is not a white pixel is included in scanned image data obtained by reading the originally blank paper, the pixel as an abnormal pixel. The calculated feature amount is used in a scanner abnormality location estimation unit 1112 to be described below similarly as the chart analysis.

According to the present exemplary embodiment, the abnormality location in the scanner and the abnormality location in the printer are separately identified using a feature amount calculated by the image analysis unit 1111 and a database as an example of an abnormality location estimation process.

The database is a database in which the feature amount is associated with the actual abnormality location based on result data.

More specifically, the database, in the printer abnormality location estimation unit 1113, is a collection of data on the abnormality locations, such as the fixing device, the developing device, and the photosensitive drum, and feature amounts which have been obtained in the past when the abnormalities have occurred in such components. Further, the database, in the scanner abnormality location estimation unit 1112, is a collection of data on smudge and scratching of the document positioning glass plate, smudge of the mirror in the mirror unit, and the abnormality in the CCD sensor, and feature amounts which have been obtained in the past when such abnormality have occurred.

Since frequency feature amounts and color feature amounts are respectively calculated according to the above-described frequency analysis and color analysis, there may be a plurality of databases. An image feature amount may be calculated from a plurality of feature amounts, and the database may be generated. Further, the database may be independently managed for each of the image forming apparatuses 101, 102, and 103, or there may be one collective database. For example, if the image forming apparatuses 101, 102, and 103 are the same models, and there is commonality in a relation between the abnormality location in which the abnormality has occurred and the feature amount obtained when the abnormality has occurred, the database may be collectively generated. However, if there is no commonality in the relation between the abnormality location in which the abnormality has occurred and the feature amount obtained when the abnormality has occurred even if the image forming apparatuses 101, 102, and 103 are the same models, the databases are separately generated.

Further, the database may be generated using data previously predicted when designing the apparatus, or data of previous products as well as results obtained by the service person.

A Bayes' expansion formula may be used as a method for estimating the abnormality location from the database and the obtained feature amount. The Bayes' expansion formula is a general formula for calculating a probability of obtaining certain data (the feature amount according to the present exemplary embodiment) from the cause (the abnormality location according to the present exemplary embodiment). Further, other methods may be used as long as the abnormality location can be estimated.

According to the present exemplary embodiment, the image inspection apparatus 110 calculates the feature amount. However, the image forming apparatus (100, 101, or 102) may calculate the feature amount and transmit the calculated feature amount to the image inspection apparatus 110. Other server (not illustrated) may be used for calculating the feature amount and estimating the abnormality location.

According to the present exemplary embodiment, the scanned image is obtained using the scanner 140. However, a value obtained using other measurement device or a value calculated from the obtained value may be used as the feature amount.

<Flowchart of Process Performed by Image Forming Apparatus>

Figure 11:
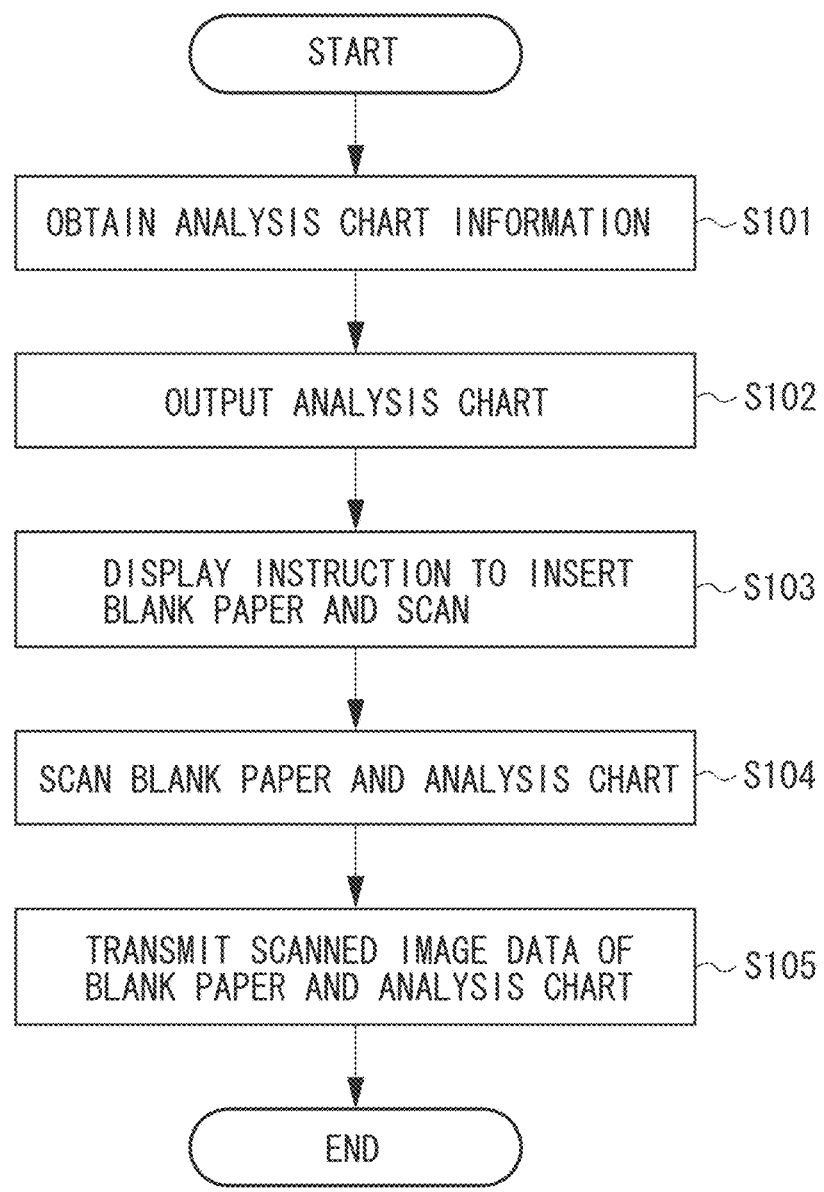
FIG. 11 is a flowchart illustrating an example of a process performed by an image forming apparatus according to a first exemplary embodiment.

FIG. 11 is a flowchart illustrating a process performed by the image forming apparatus according to the present exemplary embodiment. The CPU 2100 executes the process of the flowchart illustrated in FIG. 11 according to the program stored in the HDD 2130. The process is performed for reproducing, using the analysis chart, the abnormal image caused by the abnormality which has occurred in the image forming apparatus and transmitting the reproduced abnormal image to the image inspection apparatus 110.

If the abnormal image is generated when the image forming apparatus performs printing, the user of the image forming apparatus executes the process of the flowchart illustrated in FIG. 11.

In step S101, the CPU 2100 obtains information on the analysis chart indicating what type of chart will be output. There is a plurality of analysis charts according to the objective of the analysis as described with reference to FIG. 10.

In step S102, the CPU 2100 outputs the analysis chart prepared in step S101. More specifically, the CPU 2100 transfers and fixes a toner attached to the drum (not illustrated) in the image forming apparatus to a sheet by using the printer 120. As a result, the analysis chart is printed on the sheet and output from the sheet discharge tray 124. As described above, if the image abnormality, such as streaks or unevenness, has occurred due to the abnormality in the printer, the image abnormality occurs in the printed analysis chart.

In step S103, the CPU 2100 displays an instruction to scan the analysis chart output in step S102 and the blank paper on the display unit (not illustrated) in the operation unit 160. More specifically, the CPU 2100 displays "Insert blank paper to top page of printed charts, and set charts and blank paper facing upwards on document feeder. After setting, press document read start button." The instruction may be displayed using diagrams and graphics as long as the user becomes capable of correctly setting the analysis charts and the blank paper on the document feeder 141. Further, if the image forming apparatus includes a unit for determining whether a first page of the documents to be scanned is the blank paper, such a unit may be used to determine whether there is the blank paper. If the unit determines that there is no blank paper, the CPU 2100 may display a warning prompting the user to insert the blank paper on the display unit in the operation unit 160.

In step S104, upon receiving the scan instruction from the user, the CPU 2100 scans the documents (the blank paper and the analysis charts) placed on the document feeder 141. The scanner 140 performs scanning using the document feeding-reading mode. The scanner IF image processing unit 2400 then appropriately performs image processing on the scanned image data obtained by scanning the documents, and the processed data is stored in the HDD 2130. As described above, when the scanner 140 scans the documents in the document feeding-reading mode, the image abnormality, such as a streak, may occur in the scanned image data. The image abnormality may thus be further superimposed on the scanned image data of the analysis chart in which the image abnormality has occurred in printing.

In step S105, the CPU 2100 transmits the scanned image data of the analysis charts and the blank paper read in step S104 and stored in the HDD 2130 to the image inspection apparatus 110. More specifically, the CPU 2100 transmits the data to the image inspection apparatus 110 connected to the LAN 10 via the LANC 2200.

By the above-described process, the scanned image data of the analysis charts and the blank paper in which the image abnormality that has occurred in the image forming apparatus is reproduced is transmitted to the image inspection apparatus 110.

<Flowchart of Image Inspection Process Performed by Image Inspection Apparatus>

Figure 12:
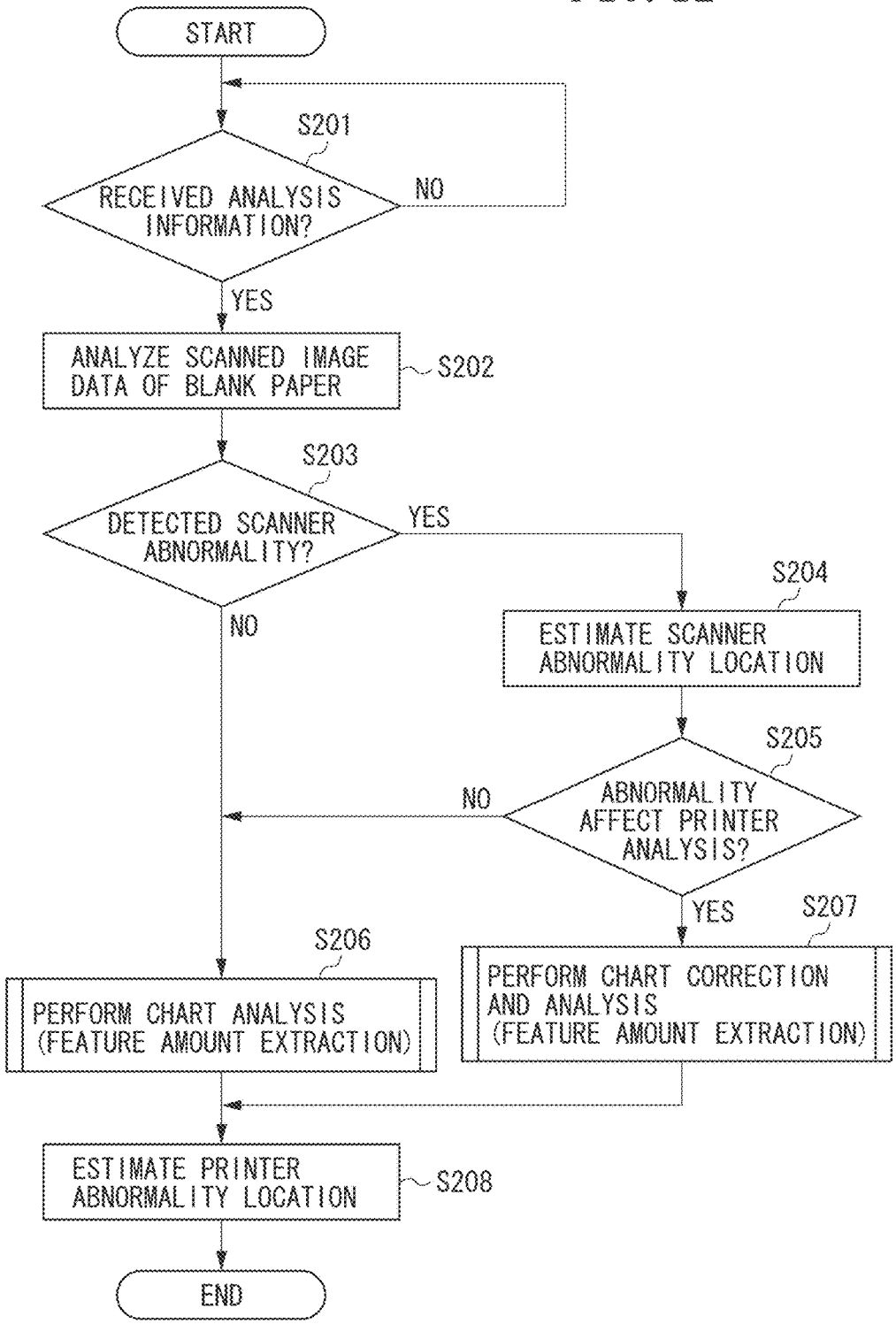
FIG. 12 is a flowchart illustrating an example of a process performed by the image inspection apparatus.

FIG. 12 is a flowchart illustrating the image inspection process performed by the image inspection apparatus 110 according to the present exemplary embodiment. The CPU 1101 executes the process of the flowchart illustrated in FIG. 12 according to the program stored in the HDD 1104. The process is performed for identifying the cause of the abnormal image generated by the image forming apparatus.

In step S201, the CPU 1101 receives the scanned image data obtained by scanning the analysis charts and the blank paper from the image forming apparatus. The scanned image data is the data transmitted from the image forming apparatus in step S105 of the flowchart illustrated in FIG. 11. If CPU 1101 receives the scanned image data obtained by scanning the analysis charts and the blank paper (YES in step S201), the process proceeds to step S202.

In step S202, the CPU 1101 analyzes the blank paper scanned image data obtained by scanning the blank document among the received scanned image data. More specifically, such an analysis is a function of the image analysis unit 1111, and the image analysis unit 1111 calculates the feature amount using the blank paper scanned image data for confirming the abnormality location in the scanner. As described above, the feature amount is for identifying, if a pixel which is not a white pixel is included in the image data obtained by scanning the blank paper, the pixel as the abnormal pixel. Further, the analysis result is calculated as the feature amount similarly as when the chart analysis is performed.

In step S203, the CPU 1101 determines whether a scanner abnormality has been detected as a result of analyzing the blank paper in step S202. The scanner abnormality is a failure which has occurred in scan processing performed by the image forming apparatus in step S104 illustrated in FIG. 11. The CPU 1101 performs the determination based on whether there is an abnormal pixel included in the blank paper scanned image data. If the CPU 1101 determines that the abnormality is detected (YES in step S203), the process proceeds to step S204. If the CPU 1101 determines that the abnormality is not detected (NO in step S203), the process proceeds to step S206.

In step S204, the CPU 1101 estimates the abnormality location in the scanner according to the function of the scanner abnormality location estimation unit 1112. As described above, the abnormality location in the scanner is estimated by using the Bayes' expansion formula based on the feature amount obtained in step S202. The abnormality to be estimated includes the abnormality of the CCD sensor which requires replacement the component. Further, the abnormality to be estimated includes smudge of the document positioning glass plate or smudge of the mirror in the mirror unit, which requires cleaning instead of replacement of the component. The service person performing maintenance and inspection of the image forming apparatus thus becomes capable of determining, using the image inspection apparatus 110, the cause of the image abnormality which has occurred in the scanner unit in the image forming apparatus from a remote location. Further, the service person becomes capable of determining the measures (replacing or adjusting the component, or clean the component). As a result, the downtime necessary for solving the image abnormality can be reduced as compared to the conventional downtime.

In step S205, the CPU 1101 determines whether the abnormality which has been determined to have occurred in step S202 affects the printer analysis. More specifically, the CPU 1101 determines whether the abnormal pixel included in the blank paper scanned image data affects extraction of the feature amount when performing the chart analysis. For example, the image abnormality may be the streak generated due to the dust adhered at the reading position when scanning is performed in the document feeding-reading mode. In such a case, it is difficult to distinguish the image abnormality from the image abnormality of a streak generated due to smudge or abnormality in the printer 120. The image abnormality may thus be misrecognized as the abnormality which has occurred due to the printer 120. In such a case, the CPU 1101 determines that the abnormality affects the printer analysis (YES in step S205), and the process proceeds to step S207. On the other hand, if the abnormal pixel is outside of the range to be used for analyzing the chart, the CPU determines the abnormality does not affect the printer analysis (NO in step S205), and the process proceeds to step S206.

In step S206, the CPU 1101 analyzes the charts received from the image forming apparatus. The CPU 1101 thus extracts the feature amount necessary for estimating the abnormality location in the printer 120. The process performed in step S206 will be described in detail below.

In step S207, the CPU 1101 analyzes the charts received from the image forming apparatus while reducing the effect of the abnormal pixel due to the scanner. As a result, the CPU 1101 becomes capable of extracting the feature amount necessary for estimating the abnormality location in the printer 120 even if the scanned image data of the analysis chart includes the abnormal pixel due to the scanner. The process performed in step S207 will be described in detail below.

In step S208, the CPU 1101 estimates the abnormality location in the printer according to the function of the printer abnormality location estimation unit 1113. As described above, the abnormality location in the scanner is estimated by using the Bayes' expansion formula based on the feature amount obtained in step S206 or step S207. The abnormality to be estimated includes the abnormality of the developing device, the photosensitive drum, and the fixing device which are components necessary for printing. The service person performing the maintenance and the inspection of the image forming apparatus thus becomes capable of determining, using the image inspection apparatus 110, the cause of the image abnormality which has occurred in the printer unit in the image forming apparatus from a remote location. Further, the service person becomes capable of determining the measures (replacing or adjusting the component, or cleaning the component). As a result, the downtime required for solving the image abnormality can be reduced as compared to the conventional downtime.

<Flowchart of Chart Analysis Process>

Figure 13:
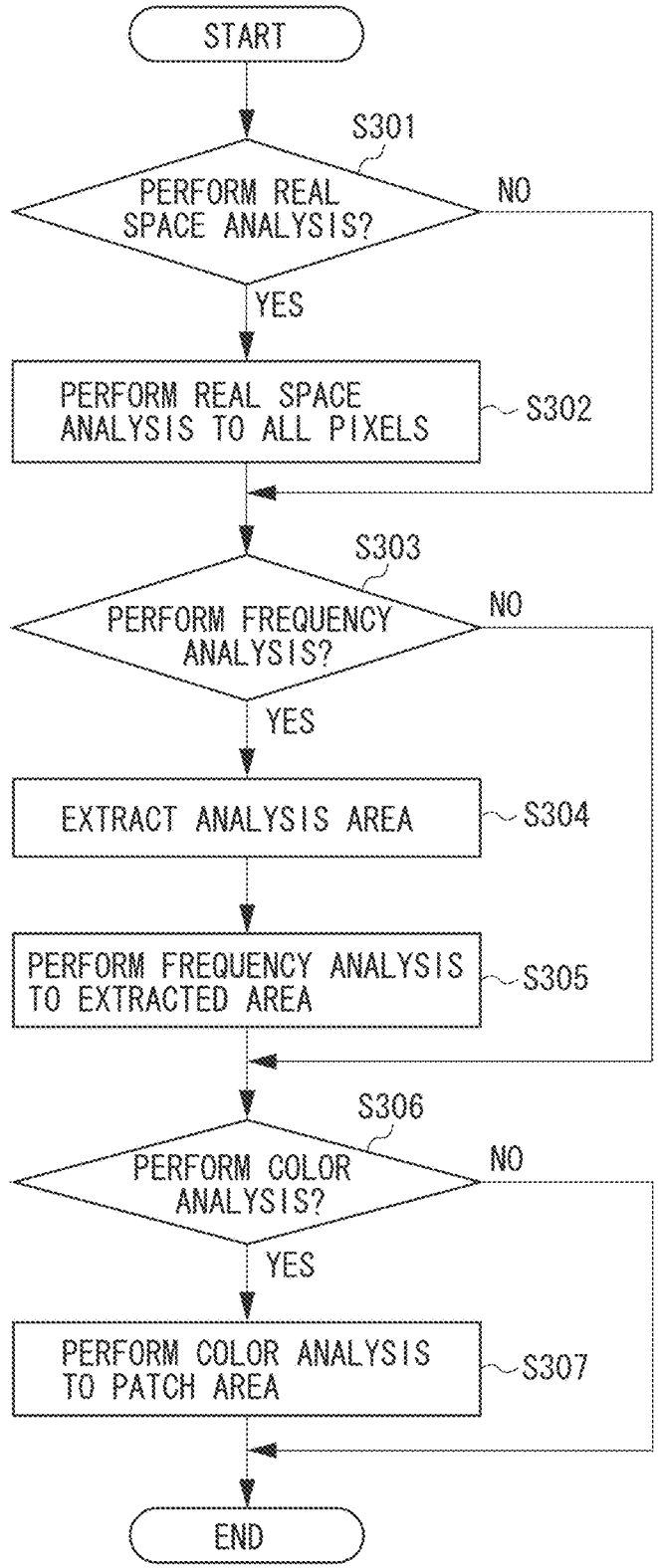
FIG. 13 is a flowchart illustrating an example of a chart analysis process performed by the image inspection apparatus.

FIG. 13 is a flowchart illustrating a chart analysis process performed by the image inspection apparatus 110 according to the present exemplary embodiment. FIG. 13 illustrates in detail the process of step S206 illustrated in FIG. 12. The CPU 1101 executes the process of the flowchart illustrated in FIG. 13 according to the function of the image analysis unit 1111 in the image inspection program 1110 stored in the HDD 1104.

In step S301, the CPU 1101 determines whether real space analysis, which is an analysis method, is to be performed, based on the type of the analysis chart. In other words, the CPU 1101 determines based on whether the analysis chart corresponding to currently-focused scanned image data requires the real space analysis to be performed.

If the CPU 1101 determines that the real space analysis is to be performed (YES in step S301), the process proceeds to step S302. If the CPU 1101 determines that the real space analysis is not to be performed (NO in step S301), the process proceeds to step S303. In step S302, the CPU 1101 performs the real space analysis to all pixels. For example, the CPU 1101 obtains a histogram of the signal values of all pixels in the scanned image data of the analysis chart. The CPU 1101 then compares the obtained histogram with a histogram obtained from the previously-stored scanned image data of the analysis chart that has been output when it has been determined that there is no image abnormality. The CPU 1101 extracts the difference as the feature amount.

In step S303, the CPU 1101 then determines whether to perform the frequency analysis, which is an analysis method, based on the type of the analysis chart. The CPU 1101 determines based on whether the analysis chart corresponding to the currently-focused scanned image data requires the frequency analysis to be performed. If the CPU 1101 determines that the frequency analysis is to be performed (YES in step S303), the process proceeds to step S304. If the CPU 1101 determines that the frequency analysis is not to be performed (NO in step S303), the process proceeds to step S306.

In step S304, the CPU 1101 extracts a frequency analysis area. More specifically, the CPU 1101 extracts the analysis area of a size, such as 512×512 pixels, from the scanned image data of the analysis chart. The extracted area is basically square-shaped, and the size is determined so that the feature of the cause of the image abnormality to be detected can be easily extracted. The CPU 1101 may extract a plurality of areas according to the occurrence of the image abnormalities and repeatedly perform the frequency analysis. The CPU 1101 may automatically perform the area extraction, or the user may indicate the extraction area from the operation unit 1106 in the image inspection apparatus 110 which includes the input/output devices, such as the liquid crystal display and the mouse.

In step S305, the CPU 1101 performs the frequency analysis on the area of the scanned image data of the analysis chart extracted in step S304. For example, a result of whether the component other than the direct-current component is detected by the frequency analysis may be extracted as the feature amount.

In step S306, the CPU 1101 determines whether to perform the color analysis, which is an analysis method, based on the type of the analysis chart. The CPU 1101 determines based on whether the analysis chart corresponding to the currently-focused scanned image data (for example, the color patch chart) requires the color analysis to be performed. If the CPU 1101 determines that the color analysis is to be performed (YES in step S306), the process proceeds to step S307. If the CPU 1101 determines that the color analysis is not to be performed (NO in step S306), the process ends.

In step S307, the CPU 1101 performs the color analysis on the patch area in the analysis chart. For example, the CPU 1101 uses a pixel value of the patch obtained by averaging the pixel values in a small area in the patch among the scanned image data of the analysis chart. The CPU 1101 then obtains the feature amount from the difference between the obtained pixel value and a pixel value of the patch included in the scanned image data of the analysis chart that has been output when it has been determined that there is no abnormal image. Further, if the same color patches are arranged in the analysis chart, the CPU 1101 compares pixel values of the patches and extracts uniformity within a plane as the feature amount.

The chart analysis process performed by the image inspection apparatus 110 is as described above.

<Flowchart of Chart Correction and Analysis Process>

Figure 14:
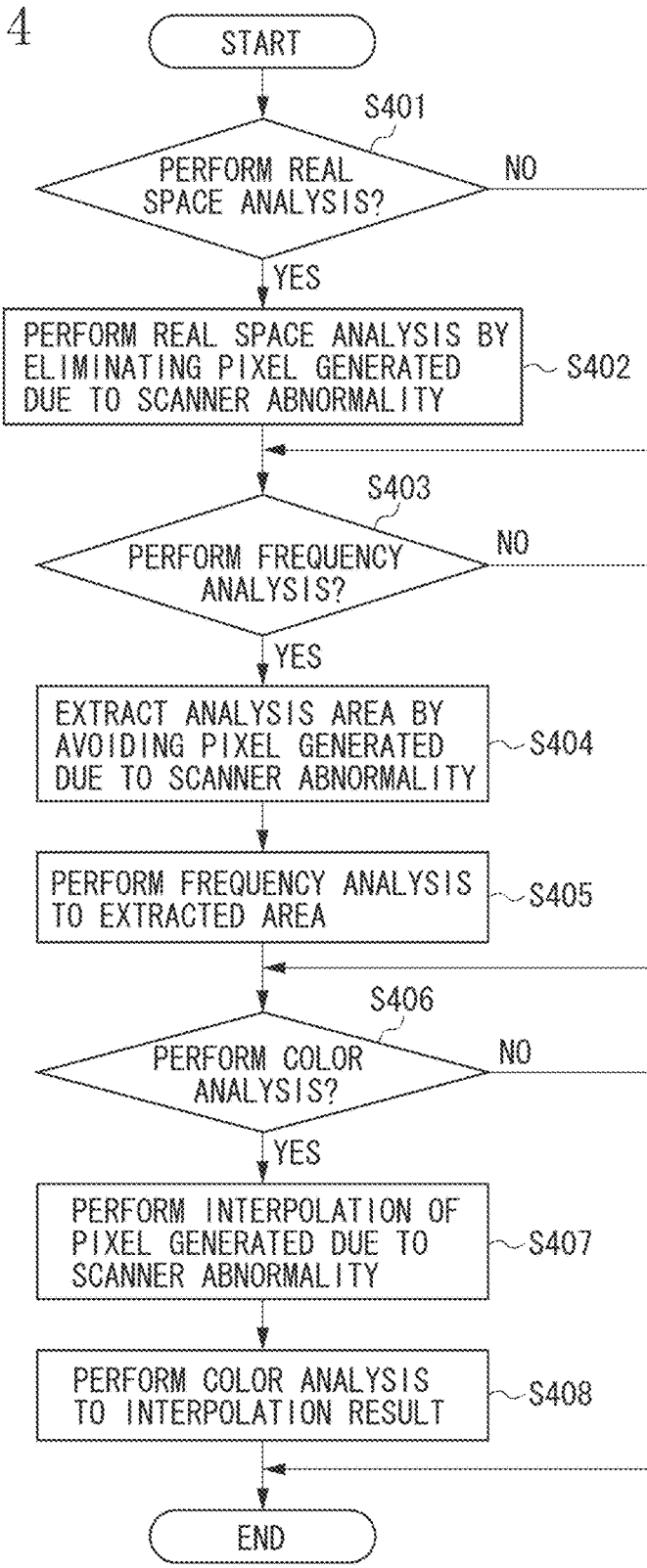
FIG. 14 is a flowchart illustrating an example of a chart correction and analysis process performed by the image inspection apparatus.

FIG. 14 is a flowchart illustrating a chart correction and analysis process performed by the image inspection apparatus 110 according to the present exemplary embodiment. FIG. 14 illustrates in detail the process of step S207 illustrated in FIG. 12. The CPU 1101 executes the process of the flowchart illustrated in FIG. 14 according to the function of the image analysis unit 1111 in the image inspection program 1110 stored in the HDD 1104.

In step S401, the CPU 1101 determines whether the real space analysis, which is an analysis method, is to be performed. If the CPU 1101 determines that the real space analysis is to be performed (YES in step S401), the process proceeds to step S402. If the CPU 1101 determines that the real space analysis is not to be performed (NO in step S401), the process proceeds to step S403.

In step S402, the CPU 1101 eliminates a pixel corresponding to the abnormal pixel caused by scanning in the scanned image data of the analysis chart, and performs the real space analysis.

For example, it is assumed that the abnormality such as the streak illustrated in FIG. 5 has occurred in the analysis chart due to the abnormality in the scanner 140 in the image forming apparatus. In such a case, the streak as illustrated in FIG. 5 is also generated in the scanned image data of the blank paper. The CPU 1101 thus generates scanned image data in which pixels in the scanned image data of the analysis chart at position corresponding to the abnormal pixels detected in the scanned image data of the blank paper is eliminated. The CPU 1101 then obtains a histogram of the signal values of the generated scanned image data. As a result, only the abnormality which has occurred in the printer 120 in the image forming apparatus is reflected in the histogram. The CPU 1101 then compares the obtained histogram with the histogram obtained from the previously-stored scanned image data of the analysis chart that has been output when it has been determined that there is no image abnormality. The CPU 1101 extracts the difference as the feature amount.

In step S403, the CPU 1101 determines whether to perform the frequency analysis, which is an analysis method, similarly as performed in step S303 illustrated in FIG. 13. If the CPU 1101 determines that the frequency analysis is to be performed (YES in step S403), the process proceeds to step S404. If the CPU 1101 determines that the frequency analysis is not to be performed (NO in step S403), the process proceeds to step S406.

In step S404, the CPU 1101 extracts the frequency analysis area of the scanned image data of the analysis chart while avoiding the pixel corresponding to the abnormal pixel caused by scanning to the scanned image data of the analysis chart. For example, it is assumed that the abnormality such as the streak illustrated in FIG. 5 has occurred in the analysis chart due to the abnormality in the scanner 140 in the image forming apparatus. In such a case, the streak as illustrated in FIG. 5 is also generated in the scanned image data of the blank paper. The CPU 1101 thus generates scanned image data in which the pixels in the scanned image data of the analysis chart at the position corresponding to the abnormal pixels detected in the scanned image data of the blank paper is avoided. The CPU 1101 extracts the area to be analyzed of the size, such as 512×512 pixels, from the image data. The extracted area is basically square-shaped, and the size is determined so that the feature of the cause of the image abnormality to be detected can be easily extracted. Further, the CPU 1101 may extract a plurality of areas according to the occurrence of the image abnormalities and repeatedly perform the frequency analysis.

The CPU 1101 may automatically perform the area extraction so as to avoid the abnormal pixel due to abnormality of the scanner 140, or the user may indicate the extraction area from the operation unit 1106 in the image inspection apparatus 110 which includes the input/output devices, such as the liquid crystal display and the mouse. In such a case, the CPU 1101 performs adjustment so that the user cannot select the abnormal pixel positions on the liquid crystal display.

In step S405, the CPU 1101 performs the frequency analysis on the area of the scanned image data of the analysis chart extracted in step S404, similarly as performed in step S305 in the flowchart illustrated in FIG. 13. If the CPU 1101 performs, when performing the frequency analysis, correction such as linear interpolation of the abnormal pixel and includes the abnormal pixel in the extracted area of the frequency analysis, the CPU 1101 may obtain a frequency component due to the interpolation which is not originally to be extracted. It is thus appropriate to avoid the abnormal pixel detected in step S204 of the flowchart illustrated in FIG. 12.

In step S406, the CPU 1101 then determines whether to perform the color analysis, which is an analysis method, similarly as performed in step S306 in the flowchart illustrated in FIG. 13. If the CPU 1101 determines that the frequency analysis is to be performed (YES in step S406), the process proceeds to step S407. If the CPU 1101 determines that the frequency analysis is not to be performed (NO in step S406), the process ends.

In step S407, the CPU 1101 performs interpolation of the pixel corresponding to the abnormal pixel caused by scanning to the scanned image data of the analysis chart. For example, it is assumed that the abnormality, such as the streak illustrated in FIG. 5, has occurred in the analysis chart due to the abnormality in the scanner 140 in the image forming apparatus. In such a case, the streak as illustrated in FIG. 5 is also generated in the scanned image data of the blank paper. The CPU 1101 thus corrects the pixel in the scanned image data of the analysis chart at the position corresponding to the abnormal pixel detected in the scanned image data of the blank paper, using the surrounding pixels of the pixel.

In other words, the CPU 1101 performs linear interpolation using horizontally-adjacent pixels of the abnormal pixel included in the scanned image data, and replaces the abnormal pixel with the calculation result of the linear interpolation.

In step S408, the CPU 1101 performs the color analysis on the patch area in the analysis chart, similarly as performed in step S307. Since it is difficult to extract the feature amount by avoiding the abnormal pixel in a small area, such as the patch, it is appropriate to perform correction by interpolation.

The chart correction and analysis process is as described above.

The process performed in the flowchart illustrated in FIG. 14 is different from the process performed in the flowchart illustrated in FIG. 13 as follows. The CPU 1101 appropriately selects eliminating, avoiding, or correcting a scan abnormal pixel according to the analysis method for reducing the effect of the abnormal pixel caused by scanning on the chart analysis.

In other words, if the image forming apparatus scans the analysis chart and the image abnormality due to the abnormality in or the smudge of the scanner 140 occurs, a value obtained from the scanned image data of the analysis chart is corrected by a value obtained from the scanned image data of the blank paper.

The abnormality location in the printer can thus be estimated using the corrected value obtained from the scanned image data of the analysis chart.

As a result, if the image forming apparatus scans the analysis chart and the image abnormality due to the abnormality or the smudge of the scanner 140 occurs, the effect is reduced, and the abnormality in the printer unit can be estimated by appropriately using the analysis chart.

According to the first exemplary embodiment, whether the abnormal pixel included in the scanned image data transmitted from the image forming apparatus is generated in the scanner 140 or the printer 120 is determined by inserting the blank paper. According to a second exemplary embodiment, whether the abnormal pixel included in the scanned image data transmitted from the image forming apparatus is generated in the scanner 140 or the printer 120 is determined without inserting the blank paper. Lowering of usability due to an insertion operation of the blank document can thus be reduced, as will be described below.

According to the present exemplary embodiment, the process performed by the image forming apparatus is different from the process according to the first exemplary embodiment. The hardware configurations of the image forming apparatus and the image inspection apparatus are similar to those according to the first exemplary embodiment. The differences from the first exemplary embodiment will be described in detail below.

<Flowchart of Process Performed by Image Forming Apparatus>

FIG. 15 is a flowchart illustrating the process performed by the image forming apparatus according to the second exemplary embodiment. The CPU 2100 executes the process of the flowchart illustrated in FIG. 15 according to the program stored in the HDD 2130. The process is performed for reproducing, using the analysis chart, the abnormal image caused by the abnormality which has occurred in the image forming apparatus and transmitting the reproduced abnormal image to the image inspection apparatus. In other words, if the abnormal image is generated when the image forming apparatus performs printing, the user of the image forming apparatus executes the process.

In step S501, the CPU 2100 obtains information on the analysis chart indicating what type of chart will be output. There is a plurality of analysis charts according to the objective of the analysis as described with reference to FIG. 10.

In step S502, the CPU 2100 outputs the analysis chart prepared in step S501. More specifically, the CPU 2100 uses the printer 120 and transfers the toner attached to the drum (not illustrated) in the image forming apparatus to a sheet and fixes the transferred toner on the sheet. As a result, the analysis chart is printed on the sheet and output from the sheet discharge tray 124. As described above, if the image abnormality such as streaks or unevenness has occurred, the image abnormality occurs in the printed analysis chart.

In step S503, the CPU 2100 displays an instruction to scan the analysis chart output in step S502 on the display unit (not illustrated) in the operation unit 160. More specifically, the CPU 2100 displays "Set the printed charts on the document feeder facing upwards. After setting, press document read start button." The instruction may be displayed using diagrams and graphics as long as the user becomes capable of correctly setting the analysis charts on the document feeder 141. The CPU 2100 forcibly sets a document reading mode to a two-sided document scan mode. Further, the CPU 2100 may display "set document read mode to two-sided document mode" on the display unit in the operation unit 160 and cause the user to set the document reading mode to the two-sided document scan mode.

In step S504, upon receiving the scan instruction from the user, the CPU 2100 performs the two-sided scan of the document (the analysis charts) placed on the document feeder 141. The scanner 140 performs scanning in the document feeding-reading mode. The scanner IF image processing unit 2400 then appropriately performs image processing on the scanned image data obtained by scanning the documents, and the processed data is stored in the HDD 2130. As described above, when the scanner 140 scans in the document feeding-reading mode, the image abnormality may occur due to the abnormality in the scanner 140. The image abnormality may thus be further superimposed on the scanned image data of the analysis chart in which the image abnormality has occurred when the analysis chart has been printed. According to the present exemplary embodiment, the CPU 2100 performs the two-sided scan, and the scanner 140 also scans a back side of the analysis chart. The back side is read for determining whether there is an abnormality occurring in the scanner 140. According to the present exemplary embodiment, the analysis chart in which the back side is used in the two-sided scan is a document in which only one side is printed. In other words, according to the present exemplary embodiment, the image forming apparatus reads the back side which is blank, and the back side of the analysis chart is constantly blank. As a result, the back side which is a white data side substitutes the blank paper scanned according to the first exemplary embodiment. In particular, an effective result is obtained when applied to the image forming apparatus which reads both the front side and the back side using the same image sensor.

In step S505, the scanned image data of the analysis chart read in step S504 and stored in the HDD 2130 is transmitted to the image inspection apparatus 110. The image data of the back side is also transmitted. The data is transmitted to the image inspection apparatus 110 connected to the LAN 10 via the LANC 2200.

By performing the above-described process, the scanned image data of the analysis chart and the back side in which the image abnormality that has occurred in the image forming apparatus is reproduced is transmitted to the image inspection apparatus 110. The process illustrated in FIG. 15 ends.

According to the first exemplary embodiment, the scanned image data of the blank paper is analyzed in step S202 in the process performed by the image inspection apparatus 110 illustrated in the flowchart of FIG. 12. According to the second exemplary embodiment, the scanned image data of the image of the back side of the analysis chart is used in performing the analysis. In such a case, the scanned image data of the back side of the analysis chart of the top page is taken as only one page of the scanned image data of the back side, and the result may be used in performing analysis of all charts. Further, if the back sides of all analysis charts are blank, the front side and the back side of the analysis chart may be paired, and the analysis result of the scanned image data of the back side may be used in the chart analysis of the front side.

By performing the above-described process, whether the abnormal pixel included in the scanned image data transmitted from the image forming apparatus is generated in the scanner 140 or the printer 120 can be determined without inserting the blank paper. Lowering of usability due to the insertion operation of the blank document can thus be reduced.

According to the present exemplary embodiment, the back side of the analysis chart is scanned instead of scanning the inserted blank paper. However, the image data obtained by performing scanning before conveying the document (the image data obtained by reading a white color surface on the conveyance drum 1415) may be used instead of inserting the blank paper. In such a case, the same result as inserting the blank paper can be obtained.

Further, according to the first and second exemplary embodiments, the image inspection apparatus 110 performs the image inspection process of the flowchart illustrated in FIG. 12. However, the CPU 2100 in the image forming apparatus may perform the process according to the program stored in the HDD 2130.

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2013-241946 filed Nov. 22, 2013, which is hereby incorporated by reference herein in its entirety.

What is claimed is:

1. An apparatus comprising:
a controller including a memory storing instructions and a processor which executes the instructions, the controller being configured to function as:
an obtaining unit configured to obtain first image data obtained by reading, performed by a reading unit, a chart on which an image has not been printed by an image forming unit and second image data obtained by reading, performed by the reading unit, a chart on which an image has been printed by the image forming unit;
a determination unit configured to determine whether an abnormality has occurred in the reading unit using a feature amount obtained from a result of analyzing the first image data;
a correcting unit configured to correct, if the determination unit determines that an abnormality has occurred in the reading unit, a feature amount obtained from a result of analyzing the second image data using the feature amount obtained from a result of analyzing the first image data; and
an estimation unit configured to estimate a cause of an abnormality that has occurred in the image forming unit using the feature amount corrected by the correcting unit,
wherein, if the determination unit determines that an abnormality has not occurred in the reading unit, the estimation unit estimates a cause of an abnormality that has occurred in the image forming unit using the feature amount obtained from a result of analyzing the second image data.

2. The apparatus according to claim 1, wherein the estimation unit estimates a cause of an abnormality that has occurred in the image forming unit using data in which either the feature amount corrected by the correcting unit or the feature amount obtained from a result of analyzing the second image data is associated with the cause of the abnormality.

3. The apparatus according to claim 1, wherein there is a plurality of types of chart and a type of chart is determined according to a type of abnormality that has occurred in the image forming unit estimated by the estimation unit.

4. The apparatus according to claim 1, wherein, in a case where it is determined that an abnormality has occurred in the reading unit as a result of analyzing the first image data, a cause of the abnormality in the reading unit is estimated using a feature amount obtained from a result of analyzing the first image data.

5. The apparatus according to claim 1, wherein, in a case where it is determined that an abnormality has occurred in the reading unit as a result of analyzing the first image data and it is determined that the abnormality in the reading unit does not affect the apparatus, the second image data is not changed and a feature amount is obtained from the second image data.

6. The apparatus according to claim 1, wherein a method for changing the second image data using the first image data is different depending on a method for analyzing the second image data.

7. The apparatus according to claim 1, wherein the estimation unit eliminates, in a case where a method for analyzing the second image data is real space analysis, and performs estimation using a feature amount obtained by analyzing the second image data in which the pixel corresponding to an abnormal pixel included in the first image data has been eliminated.

8. The apparatus according to claim 1, wherein the estimation unit eliminates, in a case where a method for analyzing the second image data is frequency analysis, and determines an area to be analyzed from the second image data in which the pixel corresponding to an abnormal pixel included in the first image data has been eliminated, and performs estimation using a feature amount obtained by analyzing the image data of the area.

9. The apparatus according to claim 1, wherein the estimation unit interpolates, in a case where a method for analyzing the second image data is color analysis, and performs estimation using a feature amount obtained by analyzing the second image data in which an abnormal pixel included in the first image data has been interpolated by pixels surrounding the abnormal pixel.

10. The apparatus according to claim 1, wherein a chart in which an image has not been formed by the image forming unit is a back side of a chart used when obtaining the second image data.

11. The apparatus according to claim 1, wherein the first image data is obtained by the reading unit reading the chart, wherein the chart is a white color surface of a document reading position which an image has not been formed by the image forming unit.

12. The apparatus according to claim 1, wherein a chart in which an image has not been formed by the image forming unit is a blank paper.

13. The apparatus according to claim 1, wherein the reading unit and the image forming unit are included in an image forming apparatus connected to the apparatus.

14. A control method of an apparatus comprising:
obtaining first image data obtained by reading, performed by a reading unit, a chart on which an image has not been printed by an image forming unit printer and second image data, obtained by reading, performed by the reading unit, a chart on which an image has been printed by the image forming unit;
determining whether an abnormality has occurred in the reading unit using a feature amount obtained from a result of analyzing the first image data;
correcting, if it is determined that an abnormality has occurred in the reading unit, a feature amount obtained from a result of analyzing the second image data using the feature amount obtained from a result of analyzing the first image data; and
estimating a cause of an abnormality that has occurred in the image forming unit using the feature amount corrected,
wherein, if it is determined that an abnormality has not occurred in the reading unit, a cause of an abnormality that has occurred in the image forming unit using the feature amount obtained from a result of analyzing the second image data is estimated.

15. A non-transitory computer-readable storage medium storing computer executable instructions for causing a computer to executed a control method of an apparatus, the method comprising:
obtaining first image data obtained by reading, performed by a reading unit, a chart on which an image has not been printed by an image forming unit and second image data, obtained by reading, performed by the reading unit, a chart on which an image has been printed by the image forming unit;
determining whether an abnormality has occurred in the reading unit using a feature amount obtained from a result of analyzing the first image data;
correcting, if it is determined that an abnormality has occurred in the reading unit, a feature amount obtained from a result of analyzing the second image data using the feature amount obtained from a result of analyzing the first image data; and
estimating a cause of an abnormality that has occurred in the image forming unit using the feature amount corrected,
wherein, if it is determined that an abnormality has not occurred in the reading unit, a cause of an abnormality that has occurred in the image forming unit using the feature amount obtained from a result of analyzing the second image data is estimated.

16. An apparatus comprising:
a controller including a memory storing instructions and a processor which executes the instructions, the controller being configured to function as:
an obtaining unit configured to obtain first image data obtained by reading, performed by a reading unit, a white color surface of a document reading position by an image forming unit and second image data obtained by reading, performed by the reading unit, a chart on which an image has been printed by the image forming unit;
a determination unit configured to determine whether an abnormality has occurred in the reading unit using a feature amount obtained from a result of analyzing the first image data;
a correcting unit configured to correct, if the determination unit determines that an abnormality has occurred in the reading unit, a feature amount obtained from a result of analyzing the second image data using the feature amount obtained from a result of analyzing the first image data; and
an estimation unit configured to estimate a cause of an abnormality that has occurred in the image forming unit using the feature amount corrected by the correcting unit,
wherein, if the determination unit determines that an abnormality has not occurred in the reading unit, the estimation unit estimates a cause of an abnormality that has occurred in the image forming unit using the feature amount obtained from a result of analyzing the second image data.

* * * * *